United States Patent
Huntemann

(10) Patent No.: US 7,982,328 B2
(45) Date of Patent: Jul. 19, 2011

(54) EMERGENCY SUPPLY UNIT WITH A RAM-AIR TURBINE ADAPTED TO BE DRIVEN BY AN AIR STREAM AND WITH AN ENERGY CONVERTER FOR AIRCRAFT

(75) Inventor: Uwe Huntemann, Oyten (DE)

(73) Assignee: Airbus Deutschland GmbH, Hamburg (DE)

( * ) Notice: Subject to any disclaimer, the term of this patent is extended or adjusted under 35 U.S.C. 154(b) by 431 days.

(21) Appl. No.: 12/161,902

(22) PCT Filed: Jan. 23, 2007

(86) PCT No.: PCT/EP2007/000558
§ 371 (c)(1),
(2), (4) Date: Jul. 24, 2008

(87) PCT Pub. No.: WO2007/085422
PCT Pub. Date: Aug. 2, 2007

(65) Prior Publication Data
US 2009/0026770 A1    Jan. 29, 2009

(30) Foreign Application Priority Data
Jan. 24, 2006   (DE) .................. 10 2006 003 138

(51) Int. Cl.
*F03D 9/00* (2006.01)
(52) U.S. Cl. ........................................ 290/55
(58) Field of Classification Search ............ 290/55, 290/54, 44, 43; 415/2.1, 4.3, 4.5, 7; 60/398; 416/7, 132 B
See application file for complete search history.

(56) References Cited

U.S. PATENT DOCUMENTS

| | | | |
|---|---|---|---|
| 4,033,115 A | 7/1977 | Baits | |
| 4,477,040 A | 10/1984 | Karanik | |
| 6,270,309 B1 * | 8/2001 | Ghetzler et al. | 415/35 |
| 6,354,804 B1 * | 3/2002 | Leung | 416/231 R |

(Continued)

FOREIGN PATENT DOCUMENTS

DE    1 032 033    6/1958

(Continued)

OTHER PUBLICATIONS

International Search Report, dated Jun. 27, 2007.

(Continued)

*Primary Examiner* — Jean F Duverne
(74) *Attorney, Agent, or Firm* — Carter, DeLuca Farrell & Schmidt LLP

(57) ABSTRACT

An emergency supply unit is provided with a ram-air turbine surrounded substantially concentrically by a casing forming a flow channel and driven by an air stream; an energy converter, driven by means of the ram-air turbine directly coupled via a drive shaft, for at least partly maintaining the functioning of a hydraulic system and/or electrical system on board an aircraft in an emergency situation; means for installing the ram-air turbine in its position within the casing such that the spatial position of the ram-air turbine remains unchanged when the emergency supply unit is selectively brought into a standby mode or into an operating mode; at least one air inlet through which the air stream can be delivered to the ram-air turbine, and which is adapted to be closed by a shut-off member; and an air outlet adapted to be closed by a shut-off member.

12 Claims, 1 Drawing Sheet

U.S. PATENT DOCUMENTS

Figure 1:
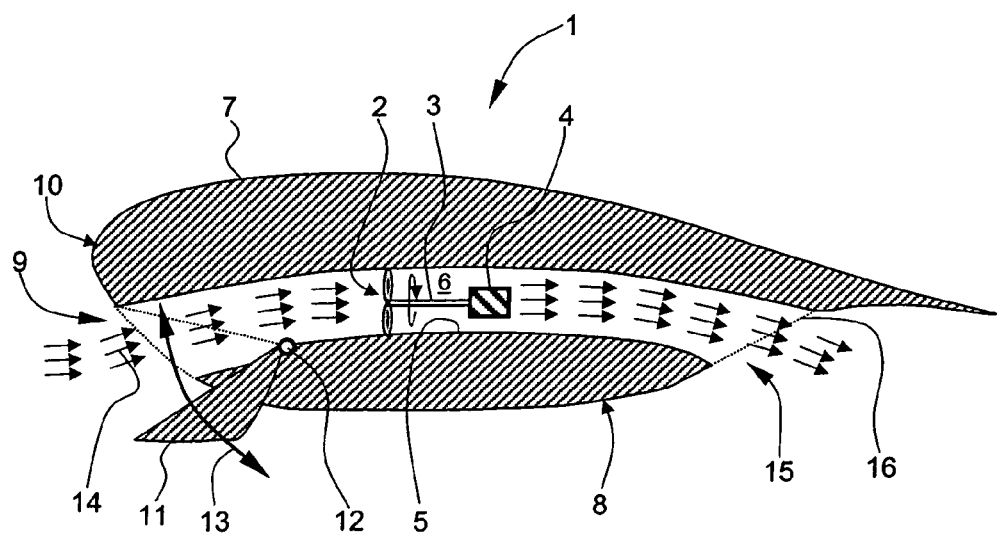

| | | | |
|---|---|---|---|
| 7,303,373 B2 * | 12/2007 | Viertl | 416/1 |
| 7,368,828 B1 * | 5/2008 | Calhoon | 290/55 |
| 7,804,185 B1 * | 9/2010 | Dravis | 290/44 |
| 2002/0122717 A1 | 9/2002 | Ghetzler et al. | |
| 2003/0011198 A1 * | 1/2003 | Eccles et al. | 290/44 |
| 2010/0207389 A1 * | 8/2010 | Nyffenegger | 290/44 |

FOREIGN PATENT DOCUMENTS

| | | |
|---|---|---|
| GB | 829 100 | 2/1960 |
| RU | 2 220 075 C1 | 12/2003 |
| SU | 67530 A1 | 10/1940 |
| WO | 9306007 | 4/1993 |
| WO | 0038985 | 7/2000 |

OTHER PUBLICATIONS

English translation of Russian Office Action for Appln. No. 2008129177/11(036024).

English translation of Russian Decision on Grant dated Apr. 6, 2010 for Appln. No. 2008129177/11(036024).

* cited by examiner

EMERGENCY SUPPLY UNIT WITH A RAM-AIR TURBINE ADAPTED TO BE DRIVEN BY AN AIR STREAM AND WITH AN ENERGY CONVERTER FOR AIRCRAFT

The invention relates to an emergency supply unit with a ram-air turbine which can be driven by an air stream and with an energy converter for at least partly maintaining the functioning of a hydraulic system and/or of an electrical system on board an aircraft in an emergency situation, wherein the energy converter can be driven by means of the ram-air turbine and the emergency supply unit can selectively be brought into a standby mode or an operating mode.

At least one so-called ram-air turbine is at present used in all larger passenger aircraft. The ram-air turbine serves to at least partly maintain the functioning of the on-board hydraulics in acute emergency situations, for example in the event of failure of all the power units, so as to guarantee minimum controllability of the aircraft even when diving. The ram-air turbine is preferably disposed below the right-hand aerofoil inside the landing flap rail covering ('fairing').

Known embodiments of ram-air turbines have a small radial propeller which is swung out of the landing flap rail covering on a long cantilever in acute emergencies and is thus exposed to the oncoming outside air. The oncoming outside air causes the radial propeller to rotate rapidly and, via a plurality of bevel drives and shafts disposed in the articulated arm, drives a small hydraulic pump for maintaining the required minimum pressure in the on-board hydraulics.

The mechanical design of the known ram-air turbines is, however, highly complex, as the rotational movement of the radial propeller must be transferred by means of a mechanical transmission, which requires a lot of maintenance and increases the failure probability, through the cantilever to the hydraulic pump disposed inside the landing flap rail covering. Moreover, the radial propeller is suddenly exposed to the air stream if it is swung out abruptly, which results in a considerable mechanical load and also increases the failure probability. Apart from the integration into the landing flap rail covering, different installation locations are only possible with considerable difficulties on account of the radial propeller. In addition, the landing flap rail covering must be of large dimensions in order to accommodate the known ram-air turbines, resulting in aerodynamic asymmetry which in turn must be compensated by means of appropriate control, guide and/or adjusting surfaces to guarantee perfect rectilinear flight, while tolerating aerodynamic losses. The aerodynamic losses in turn result in increased fuel consumption. Finally, the lines, starting from the hydraulic pump of the ram-air turbine, must be routed through the entire aerofoil up to the hydraulic node of the aircraft, which is usually disposed in the lower region of the wing box, so that the weight and the failure probability of the entire system are further increased.

The object of the invention is to provide an emergency supply system for aircraft which, with a comparable output, has a simpler mechanical structure and, in addition to the integration inside the landing flap rail covering below the aerofoil, offers additional installation options inside the entire aircraft structure.

This object is achieved by a device having the features of Claim 1.

Because at least the ram-air turbine is surrounded substantially concentrically by a casing which forms a flow channel and the energy converter is directly coupled to the ram-air turbine via a drive shaft and the air stream can be delivered to the ram-air turbine through at least one air inlet, with the spatial position of the ram-air turbine remaining substantially unchanged when changing between the standby mode and the operating mode, the result on the one hand is a simple mechanical structure without the requirement of bevel drives in a fault-prone pivot arm requiring a lot of maintenance. On the other hand, because of the absence of the pivot arm, the emergency supply unit according to the invention can be integrated in a fixed and space-saving manner, for example inside the landing flap rail covering, so that the landing flap rail covering can be of a smaller volume and aerodynamic asymmetries, which must be compensated in a complex manner while tolerating increased fuel consumption, can be reduced. Moreover, on account of the substantially completely encapsulated configuration without a pivot arm—apart from the installation inside the landing flap rail covering—the emergency supply unit according to the invention can be integrated at many installation locations inside the entire aircraft structure, so that the required line paths for connection to the corresponding on-board systems can be shortened. Furthermore, when activating the emergency supply unit according to the invention, the ram-air turbine is not exposed to any shock-like, abrupt mechanical load resulting from the abruptly oncoming outside air, which, for example in the case of radial propellers, may result in damage to the propeller blades, so that the operational reliability and fail safety overall are increased.

In one advantageous configuration of the emergency supply unit according to the invention, the energy converter includes a hydraulic pump and/or an electric generator. It is as a result possible to optionally provide an emergency supply for the hydraulic and/or for the electrical on-board system of the aircraft for maintaining at least basic functioning.

According to a further advantageous configuration, the ram-air turbine is formed with at least one screw propeller. On account of its compact design, a screw propeller can be more easily integrated into a flow channel. The efficiency of a screw propeller is in addition comparable with that of conventional, multi-blade radial propellers. Moreover, a plurality of screw propellers each having different pitches can be disposed one behind the other on the drive shaft in order to enable the energy of the air stream to be used even more efficiently. The screw propeller may also have rotor blades with adjustable pitch angles in order to permit more efficient adaptation to the respective flow velocity of the air stream. It is also possible to provide an additional coupling element in the drive shaft, so that the ram-air turbine can firstly run up to its desired speed under no-load conditions in a wear-reducing manner and only then be connected to the ram-air turbine by means of the coupling of the energy converter.

According to one advantageous configuration, the energy converter is an integral component part of the ram-air turbine. This makes it possible to dispense with the drive shaft for coupling the ram-air turbine to the energy converter, thereby further reducing the structural expenditure. In this case the energy converter, for example in the form of a hydraulic pump, at the same time forms the hub of the ram-air turbine.

In a further advantageous configuration of the emergency supply unit according to the invention the air stream can be delivered to the flow channel through at least two air channels, which are preferably disposed in a Y-shaped manner. The effective flow cross section of the individual air inlets—with an otherwise identical total flow cross section—, which form undesirable disturbing edges in aerodynamic terms, can as a result be reduced, so that the emergency supply unit can be more easily integrated into the aircraft structure in aerodynamic terms, for example in the region of the landing flap rail covering. This circumstance is of importance in particular when integrating the emergency supply unit in the region of the wing box or the fuselage nose.

According to a further configuration of the emergency supply unit according to the invention, the air stream in the flow channel can be controlled by means of at least one shut-off member. The shut-off member is completely closed when the emergency supply unit is in a standby mode, so that the air stream does not reach the ram-air turbine and consequently there is no delivery of kinetic energy from the latter to the energy converter. If the emergency supply unit is for example integrated in the landing flap rail covering, the shut-off member can be formed as a pivotable part of this landing flap rail covering, such that together with the other components of the landing flap rail covering, the shut-off member in the standby mode forms a self-contained, aerodynamically smooth outer contour. In order then to bring the emergency supply unit into an operating mode, for example during an acute emergency situation of the aircraft with complete power unit failure or similar, the shut-off member or, if the emergency supply unit is integrated in the landing flap rail covering, the pivotable covering part is opened stepwise until the air stream in the flow channel has reached its full strength and the ram-air turbine delivers its full output to the energy converter. Due to the stepwise opening of the control flap, the ram-air turbine is not abruptly subjected to the full ram pressure, so that a smooth start is guaranteed. Generally speaking, the shut-off member or shut-off members may also alternatively be formed as slide valves, butterfly valves or valves acting in a different way.

In a further advantageous configuration of the emergency supply unit, the shut-off member or the shut-off members can be remote control operated mechanically and/or electrically. This guarantees reliable operation of the emergency supply unit by the crew of the aircraft in emergencies, i.e. operation which is largely independent of the functioning of the other on-board systems.

Further advantageous configurations of the emergency supply unit are presented in the additional claims.

Figure 2:
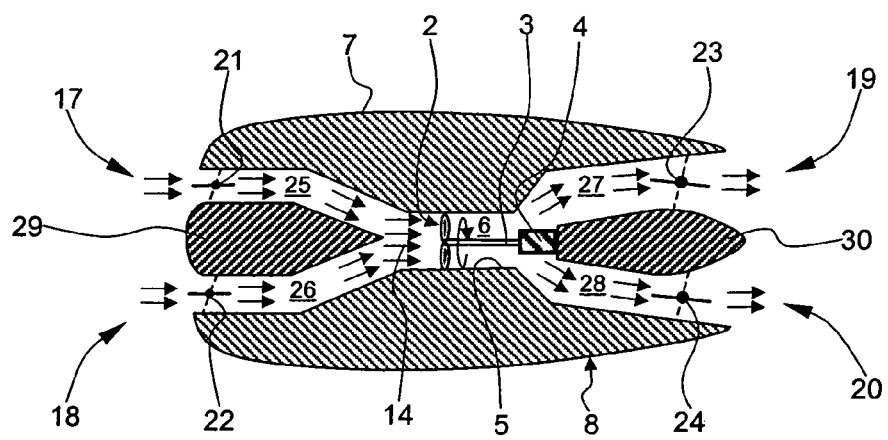

In the drawings:

FIG. 1 is a schematic cross-sectional representation of an emergency supply unit according to the invention which is integrated in a landing flap rail covering below an aerofoil of an aircraft, and FIG. 2 is a cross-sectional representation of an alternative embodiment of the flow channel.

In the drawings the same structural elements in each case have the same reference numbers.

FIG. 1 is a schematic cross-sectional representation of an emergency supply unit.

The emergency supply unit 1 according to the invention comprises, inter alia, a ram-air turbine 2 which is directly coupled to an energy converter 4 via a drive shaft 3, i.e. without the interposition of transmission elements, the said elements being surrounded substantially coaxially by a casing 5 in order to form a flow channel 6.

The casing 5 or the flow channel 6 is preferably of circular cross-sectional geometry, but may also be of elliptical, oval or angular cross-sectional geometry, at least in portions. The casing 5 may, for example, be formed using a tube, a flexible tube or the like which encloses the ram-air turbine 2 substantially concentrically.

The drive shaft 3 may optionally have a coupling, which is not represented. The ram-air turbine 2 can as a result run up under no-load conditions with little wear, until the ram-air turbine 2 has reached its desired speed and the energy converter is connected by means of the coupling.

In the illustrated embodiment, the emergency supply unit 1 is disposed below a wing 7 of an aircraft, which is not represented, in a so-called landing flap rail covering 8. A shut-off member 11, which is represented by dotted lines in the closed position, is located in the region of an air inlet 9 in the region of the leading edge 10 of the wing. The shut-off member 11, which is formed as a control flap by way of example, is pivotably held at the pivot point 12, as indicated by the direction arrow 13. The shut-off member 11 preferably enables the volumetric flow of the air stream 14 flowing through the flow channel 6 and entering the emergency supply unit from outside to be steplessly varied.

The shut-off member 11 may also alternatively be formed as a slide valve, a butterfly valve, a pinch valve, a valve acting in a different way or similar. The crucial factor is that the effective flow cross-section of the flow channel 6 can preferably be steplessly varied substantially between zero and a maximum value by means of the shut-off member 11. The shut-off member 11 can preferably be operated by remote control in a purely mechanical manner, so that the crew of the aircraft can activate the emergency supply unit 1 independently of electrical and/or hydraulic on-board systems, i.e. change it from a standby mode to an operating mode, in an acute emergency. The shut-off member 11 may alternatively be formed such that it can be operated by remote control electrically and/or hydraulically.

When the shut-off member 11 is in the open position represented by solid lines, an air stream 14 can enter the flow channel 6 and the emergency power unit 1 is in the operating mode. In the operating mode the air stream 14 passes at a high speed through the flow channel 6 and causes the ram-air turbine 2 to rotate. The ram-air turbine 2 then drives the energy converter 4 via the drive shaft 3. On the other hand, in the standby mode the shut-off member 11, which is formed as a control flap, is in the closed position which is indicated by dots and the air stream 14 flowing from outside against the leading edge 10 of the wing does not reach the ram-air turbine 2. It is preferable for the change between the standby mode of the emergency supply unit 1 and the operating mode not to take place abruptly. The shut-off member 11 is rather opened stepwise by the crew of the aircraft or in an automated manner in emergencies, so that the ram-air turbine 2 is not immediately subjected to the full air stream 14 and the desired speed is only reached slowly.

The ram-air turbine 2 preferably has a so-called screw propeller. The screw propeller has in particular the advantage that it can be more easily integrated into the flow channel 6 while being of an efficiency which is comparable with that of multi-blade radial propellers. It is alternatively possible to dispose on the drive shaft 3 a plurality of screw propellers each having a different pitch in order to enable the energy of the air stream 14 to be used even more effectively. The screw propeller may also be formed so as to be adjustable in terms of pitch angle.

According to the invention, when changing from the standby mode to the operating mode, no change in the spatial position of the drive shaft 3 or any kind of change in the direction of the flow of force between the ram-air turbine 2 and the energy converter 4 takes place. The position of the ram-air turbine 2, of the drive shaft 3 as well as of the energy converter 4 in no way changes when there is a change between the standby mode and the operating mode of the emergency supply unit 1 according to the invention, so that various installation options are obtained.

The energy converter 4 may, for example, be a hydraulic pump and/or an electric generator. The on-board hydraulics of the aircraft can be supplied by means of the hydraulic pump in acute emergencies, i.e. in the event of total failure of the power units, for example, with sufficient hydraulic pressure to guarantee controllability of the aircraft. As a result, the basic maneuverability of the aircraft is maintained and, for example, a controlled emergency landing when gliding can be performed.

After flowing through the ram-air turbine 2, the air stream 14 leaves the flow channel 6 via an air outlet 15, which is also disposed below the wing 7. In the illustrated embodiment of FIG. 1 the air outlet 15 can also be closed by a shut-off member 16 in order to avoid impairing the aerodynamics when the emergency supply unit 1 is in the standby mode. However an additional shut-off member 16 in front of the air outlet 15 is not necessary for the basic functioning of the emergency supply unit 1.

FIG. 2 shows an alternative constructional variant of a flow channel with two air inlets and two air outlets.

The ram-air turbine 2 is directly coupled to the energy converter 4 by means of the drive shaft 3 and in the illustrated embodiment is again integrated in the landing flap rail covering 8 below the wing 7. The ram-air turbine 2 is surrounded substantially concentrically by the casing 5 which forms the flow channel 6. However, unlike the representation of FIG. 1, the flow channel 6 has two air inlets 17, 18 which are brought together in a substantially Y-shaped manner to form the flow channel 6. After passing through the flow channel 6 or the ram-air turbine 2, the air stream 14 then returns to the surroundings through two air outlets 19, 20.

A respective shut-off member 21, 22 is located in the region of the air inlets 17, 18, which shut-off members are formed as butterfly valves in the illustrated embodiment. The air stream 14 in the flow channel 6 can preferably be steplessly regulated between zero and a maximum value by means of the butterfly valves. It is as a result possible for the ram-air turbine 2 to start slowly and with little wear in emergency situations. It is only after the butterfly valves have completely opened that the ram-air turbine 2 is subjected to the full air stream 14 and delivers its maximum output to the energy converter 4. The shut-off members 21, 22 or the butterfly valves can be operated by remote control manually and/or electrically. The optional shut-off members 23, 24 are in addition located at the air outlets 19, 20, these also being formed as butterfly valves in the illustrated embodiment. The shut-off members 23, 24 can also be operated by remote control mechanically and/or electrically and, when the emergency supply unit 1 is in the standby mode, serve primarily to guarantee a substantially closed outer contour of the landing flap rail covering 8 in order to improve the aerodynamics.

The advantage of the constructional variant of FIG. 2 lies in particular in the fact that it is not necessary for the full cross section of the flow channel 6 to be brought to the outside. Instead two inlet channels 25, 26 disposed substantially in a Y-shaped manner are brought together just before the ram-air turbine 2 to form the (main) flow channel 6. The flow channel 6 accordingly divides again in a substantially Y-shaped manner into two outlet channels 27, 28 in the region of the energy converter 4. In the illustrated embodiment, the inlet channels 25, 26 and the outlet channels 27, 28 in each case have approximately just half the effective flow cross section compared to the cross section of the flow channel 6, so that these can be integrated into the aircraft structure in a less disturbing manner in aerodynamic terms. The emergency supply unit 1 according to the invention can therefore be integrated into the aircraft structure with greater flexibility and independence of the structural circumstances or boundary conditions. Two flow cones 29, 30 are in addition disposed in the region of the air inlets 17, 18 as well as the air outlets 19, 20 in order to further improve the aerodynamics. The flow cones 29, 30 may optionally have variable cross-sectional areas. The constructional variant according to FIG. 2 can thus easily be integrated in the region of a fuselage nose of an aircraft or in the region of the wing box, for example.

In contrast to the known emergency systems with radial propellers rotating freely in the air stream, the emergency supply unit according to the invention does not entail the necessity of pivoting the radial propeller into the air stream by means of a complicated and fault-prone pivot arm for rotating the propeller.

In the case of the emergency supply unit according to the invention as shown in FIG. 1 it is sufficient to open the shut-off member 11 in order to rotate the ram-air turbine 2 and to drive the energy converter 4 coupled directly via the drive shaft 3. Complex, fault-prone bevel drives requiring a lot of maintenance, as are necessary in the case of the known emergency systems for guaranteeing pivotability of the radial propeller, can be eliminated.

According to the invention, the emergency supply unit remains fixed, i.e. stationary in the landing flap rail covering 8 or in the region of alternative installation locations in each mode. A change in the spatial position of the drive shaft 3 or a change in the direction of the flow of force of the drive shaft 3 when changing from the standby mode to the operating mode of the emergency unit 1 is not necessary according to the invention.

Moreover, as the shut-off members 11, 16 preferably open only slowly, the ram-air turbine 2 is not abruptly exposed to the full air stream when changing from the non-operative state to the operating mode, so that damage to the ram-air turbine 2, for example due to wing parts breaking away, which may, for example, penetrate the fuselage compartment, is largely avoided.

On account of the encapsulation, to a large extent, in the form of the casing 5 of the flow channel 6, the emergency supply unit 1 according to the invention may also be integrated in the aircraft structure at other, alternative installation locations with limited space conditions, apart from the described integration in the region of the landing flap rail covering 8.

The completely encapsulated, integral design of the emergency supply unit 1 according to the invention therefore permits a plurality of installation options in the aircraft structure. Thus the emergency supply unit 1 can be integrated in the region of the wing box, for example. For this purpose it is only necessary to provide suitable air inlets and corresponding air outlets in the region of the wing box for the constructional variant according to FIG. 2. In the case of this installation variant, the energy converter 4 or the hydraulic pump can be connected over a very short distance to the central node—usually located in the region of the wing box—of the hydraulic system of the aircraft. A complex installation of hydraulic lines through the aerofoils, which has until now been unavoidable when integrating the emergency supply unit 1 in the landing flap rail covering 8, is eliminated. The operational reliability and fail safety of the emergency supply unit 1 can be further increased and the weight at the same time reduced by means of this special installation variant.

It is also conceivable to integrate the emergency supply unit 1 in the region of the fuselage nose or the vertical tail surface of an aircraft. It is basically also possible to integrate two or more emergency supply units, for example symmetrically, in a respective landing flap rail covering of an aerofoil of the aircraft.

LIST OF REFERENCE CHARACTERS 1 emergency supply unit
2 ram-air turbine 3 drive shaft
4 energy converter
5 casing
6 flow channel
7 wing
8 landing flap rail covering
9 air inlet
10 leading edge of aerofoil
11 shut-off member (air inlet)
12 pivot point
13 direction arrow
14 air stream
15 air outlet
16 shut-off member (air outlet)
17 air inlet
18 air inlet
19 air outlet
20 air outlet
21 shut-off member
22 shut-off member
23 shut-off member
24 shut-off member
25 inlet channel
26 inlet channel
27 outlet channel
28 outlet channel
29 flow cone
30 flow cone

The invention claimed is:

1. An aircraft emergency supply unit comprising:
  a ram-air turbine driven by an air stream and surrounded substantially concentrically by a casing forming a flow channel, the ram-air turbine positioned within the casing such that the spatial position of the ram-air turbine remains unchanged when the aircraft emergency supply unit is selectively brought into a standby mode or into an operating mode,
  an energy converter for at least partly maintaining the functioning of at least one of a hydraulic system and an electrical system on board an aircraft in an emergency situation, wherein the energy converter is driven by the ram-air turbine in the operating mode and is directly coupled to the ram-air turbine via a drive shaft,
  at least one air inlet through which the air stream is delivered to the ram-air turbine in the operating mode,
  at least one shut-off member for closing the air inlet, which in the standby mode of the aircraft emergency supply unit his into the outer contour of the aircraft to optimise the aerodynamics,
  an air outlet,
  at least one shut-off member for closing the air outlet, which in the standby mode of the aircraft emergency supply unit fits into the outer contour of the aircraft to optimise the aerodynamics,
  a first inlet channel, and
  a second inlet channel, the first and the second inlet channel opening into the flow channel and having a smaller cross section than the flow channel.

2. The aircraft emergency supply unit according to claim 1, wherein the energy converter includes at least one of a hydraulic pump and an electric generator.

3. The aircraft emergency supply unit according to claim 1, wherein the energy converter is an integral component part of the ram-air turbine.

4. The aircraft emergency supply unit according to claim 1, wherein the first and the second inlet channels are disposed in a Y-shaped manner.

5. The aircraft emergency supply unit according to claim 1, wherein the air stream in the flow channel is controlled by means of the shut-off members.

6. The aircraft emergency supply unit according to claim 1, wherein the shut-off members for the air inlet and the air outlet are remote control operated.

7. The aircraft emergency supply unit according to claim 1, wherein the aircraft emergency supply unit is fixedly integratable inside a landing flap rail covering below an aircraft wing.

8. The aircraft emergency supply unit according to claim 1, wherein the aircraft emergency supply unit is fixedly integratable inside an aircraft fuselage in the region of a wing box.

9. The aircraft emergency supply unit according to claim 1, wherein the aircraft emergency supply unit is fixedly integratable in the region of a nose of an aircraft fuselage.

10. The aircraft emergency supply unit according to claim 6, wherein the shut-off members for the air inlet and the air outlet are remote control operated electrically.

11. The aircraft emergency supply unit according to claim 6, wherein the shut-off members for the air inlet and the air outlet are remote control operated mechanically.

12. The aircraft emergency supply unit according to claim 6, wherein the shut-off members for the air inlet and the air outlet are remote control operated hydraulically.

* * * * *